United States Patent [19]

Kondo

[11] Patent Number: 4,685,716
[45] Date of Patent: Aug. 11, 1987

[54] SEAT MOUNTING ARRANGEMENT
[75] Inventor: Nobuaki Kondo, Fujisawa, Japan
[73] Assignee: Nissan Motor Co., Ltd., Japan
[21] Appl. No.: 794,442
[22] Filed: Nov. 4, 1985
[30] Foreign Application Priority Data Dec. 12, 1984 [JP] Japan .......................... 59-187378[U]

[51] Int. Cl.$^4$ ............................................. B60N 1/08
[52] U.S. Cl. .................................. 296/63; 296/65 R; 248/429
[58] Field of Search ............. 296/63, 64, 65 R, 65 A; 248/429, 430

[56] References Cited

U.S. PATENT DOCUMENTS

| | | | |
|---|---|---|---|
| 3,897,101 | 7/1975 | Hess | 296/65 A |
| 3,922,029 | 11/1975 | Urai | 248/429 X |
| 4,168,051 | 9/1979 | Terada | 248/429 |
| 4,262,963 | 4/1981 | Bauer et al. | 296/65 R X |
| 4,378,101 | 3/1983 | Kazaoka | 248/429 |
| 4,395,011 | 7/1983 | Torta | 296/65 R X |
| 4,565,344 | 1/1986 | Iwami | 296/65 R X |

Primary Examiner—Robert B. Reeves
Assistant Examiner—Russell D. Stormer
Attorney, Agent, or Firm—Leydig, Voit & Mayer

[57] ABSTRACT

In a motor vehicle having a seat belt which is incorporated with a position adjustable passenger seat, there is proposed an improved seat mounting arrangement for safely supporting the seat even upon a vehicle collision. For this, a toughly constructed bracket member is employed which is connected to a floor tunnel and supports thereon a stationary member of a seat sliding mechanism.

10 Claims, 5 Drawing Figures

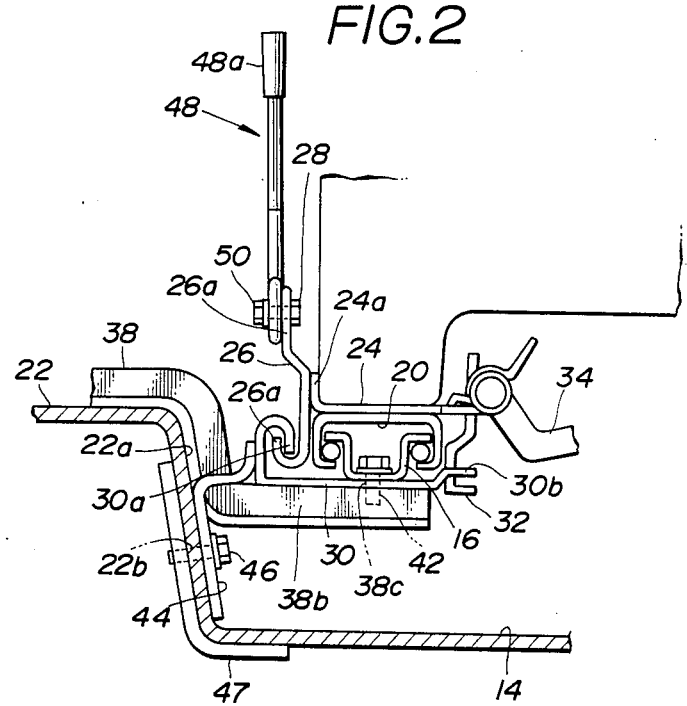

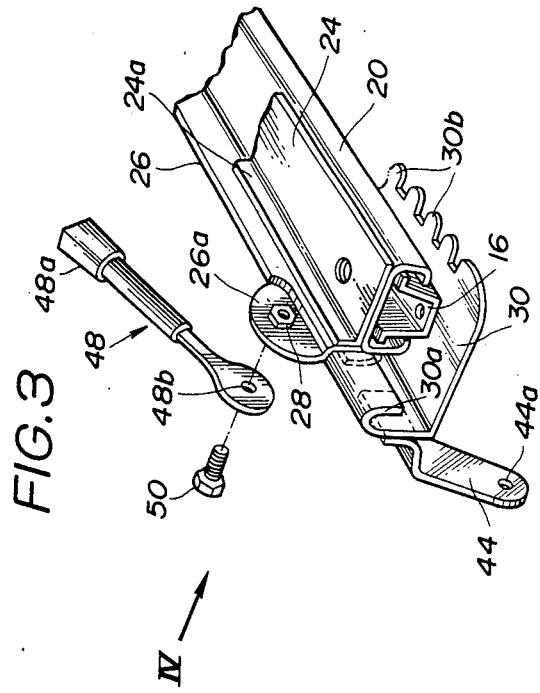
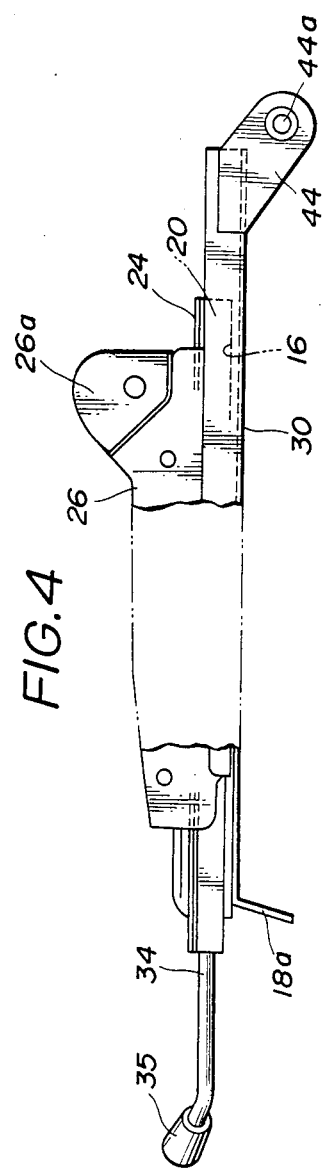

SEAT MOUNTING ARRANGEMENT

BACKGROUND OF THE INVENTION

1. Field of the Invention

The present invention relates in general to a seat mounting arrangement for a motor vehicle, and more particularly to a seat mounting arrangement for use with a motor vehicle equipped with a safety seat belt.

2. Description of the Prior Art

In passenger motor vehicles, various kinds of seat mounting arrangements have been proposed and put into practical use for mounting a passenger seat on a vehicle floor. In a case wherein a seat belt is incorporated therewith, the arrangement becomes complicated in construction because it must bear against an abnormally big shock or impact force which, upon a vehicle collision, is applied thereto through a seat belt wearer on the seat. Usually, the arrangement uses several supporting brackets for supporting the seat on the vehicle floor, so that, upon vehicle collision, the impact force applied thereto is dispersed or transmitted to the vehicle floor through the brackets. However, hitherto, construction and disposition of the brackets have been given little thought. Thus, some of the conventional seat mounting arrangements have suffered from several drawbacks, such as, insufficient strength against abnormal shock, poor external appearance, troublesome assembling work and so on.

SUMMARY OF THE INVENTION

It is therefore an object of the present invention to provide a seat mounting arrangement which is characterized by sufficient strength against shock of large magnitude, good appearance and easy assembling work.

According to the present invention, there is provided an improved seat mounting arrangement incorporated with a seat belt assembly, the seat mounting arrangement comprising a seat sliding mechanism including first and second assemblies or groups of parts, each group including a stationary rail connected to the vehicle floor and a slide rail secured to the seat and slidable on the stationary rail, so that the seat is slidable relative to the vehicle floor, the first group being located adjacent the vehicle floor tunnel; first and second brackets secured to longitudinally spaced portions of the stationary rail of the first group and connected to the vehicle floor; third and fourth brackets secured to longitudinally spaced portions of the stationary rail of the second group and connected to the vehicle floor, wherein one of the first and second brackets comprises a toughly constructed support member which transversely straddles the floor tunnel and is bolted to the same, the support member comprising a center portion at opposite longitudinal ends of the support member bolted to the floor tunnel and two wing portions extending in the opposite directions from the center portion, one of the wing portions supporting thereon the associated stationary rail and secured to the same.

BRIEF DESCRIPTION OF THE DRAWINGS

Other objects and advantages of the present invention will become apparent from the following description when taken in conjunction with the accompanying drawings, in which:

FIG. 2 is an enlarged view of an essential part of the seat mounting arrangement, which is taken from the direction of the arrow "II" of FIG. 1;

FIG. 3 is a perspective view of an inboard group of parts of a seat sliding mechanism employed in the first embodiment;

FIG. 4 is a side view of the inboard group of parts of the seat sliding mechanism, which is taken from the direction of the arrow "IV" of FIG. 3.

DESCRIPTION OF THE INVENTION

Figure 1:
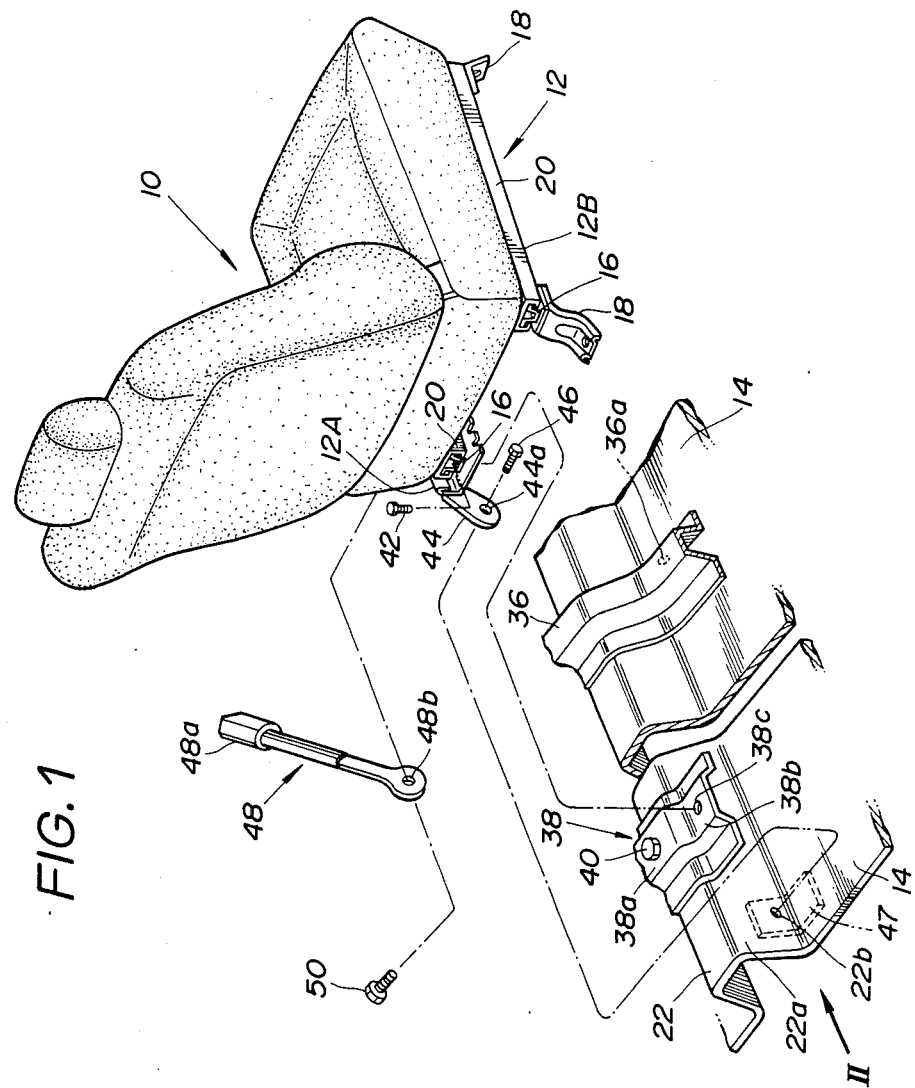
FIG. 1 is a partially broken perspective view of a seat mounting arrangement of a first embodiment of the present invention.

Referring to FIGS. 1 to 4, particularly FIG. 1, there is shown a driver's seat 10 which is incorporated with a seat mounting arrangement of the present invention.

The seat 10 is mounted on a seat sliding mechanism 12 so that the seat 10 is movable in the fore-and-aft direction relative to a vehicle floor 14. The seat sliding mechanism 12 comprises an inboard or first group of parts 12A and an outboard or second group of parts 12B each including a stationary rail 16 connected to the vehicle floor 14 and a slide rail 20 secured to the seat 10 and slidable on the stationary rail 16. The stationary rail 16 of the outboard group 12B is supported at its front and rear ends by suitable brackets 18 secured to the vehicle floor 14. The manner in which the stationary rail 16 of the inboard group 12A is connected to the vehicle floor 14 will be described hereinafter.

As is seen from FIGS. 2 and 3, the inboard group 12A (that is, the group located near a floor tunnel 22 as shown in FIG. 1) further comprises an upper plate 24 which is interposed between the slide rail 20 and the seat 10 and a side plate 26 which is secured or welded to an upwardly extending flange portion 24a of the upper plate 24. As is best seen from FIG. 3, the side plate 26 is formed at its rear portion with a rounded lug 26a to which a nut 28 is secured or welded. As is seen from FIG. 2, the side plate 26 is formed at its lower section with an upwardly curved portion 26a which extends longitudinally.

The inboard group 12A of the seat sliding mechanism 12 further comprises a lower plate 30 which is secured to the stationary rail 16. As will be described in detail hereinafter, the lower plate 30 is connected to the floor tunnel 22 through a toughly constructed bracket (38). The lower plate 30 has at its inboard side a raised portion which is formed at its upper section with a downwardly curved portion 30a which extends longitudinally. The upwardly curved portion 26a of the side plate 26 and the downwardly curved portion 30a of the lower plate 30 are slidably and interlockably engaged, as is seen from FIG. 2. The lower plate 30 is formed at its outboard side with a plurality of longitudinally aligned teeth 30b. As is seen from FIG. 2, the upper plate 24 is equipped at its outboard side with a locking pawl 32 which is pivotally connected thereto. A spring (not shown) is incorporated with the locking pawl 32 to bias the same to pivot toward the teeth 30b of the lower plate 30, that is, in the direction to engage with one of the teeth 30b. A lock lever 34 is connected to the locking pawl 32 to move therewith. As is seen from FIG. 4, the lock lever 34 extends toward the front portion of the seat 10 and is equipped with a control knob 35. When, thus, the locking pawl 32 is disengaged from the teeth 30b by handling the control knob 35, the slide rails 20 and thus the seat 10 can slide along the stationary rails 16. When, on the contrary, the locking pawl 32 is brought into locking engagement with one of the teeth 30b of the lower plate 30 with the aid of the biasing force of the spring, the slide rail 20 is locked to the stationary rail 16. With this operation, position adjustment of the seat 10 relative to the vehicle floor 14 is achieved.

Designated by numeral 36 in FIG. 1 is a cross member which is securely mounted on the vehicle floor 14 and extends across the same straddling the floor tunnel 22. As is seen from FIG. 4, a front bracket 18a is connected to a front portion of the lower plate 30. The front bracket 18a is secured at its lower end to the cross member 36. For this connection, the cross member 36 is formed with a nut-mounted opening 36a to which a connecting bolt (not shown) from the bracket 18a is engaged.

Is the rear of the cross member 36, there is provided a toughly constructed main bracket 38 which is bolted to the top of the floor tunnel 22 by a connecting bolt 40. The main bracket 38 comprises a raised center portion 38a bolted to the floor tunnel 22 and two wing portions 38b (only one wing portion is shown in the drawing) extending in the opposite directions from the center portion 38a. Each wing portion 38b is formed with a nut-mounted opening 38c. For increasing the mechanical strength, the bracket 38 is pressed to have stopped portions, as shown.

Upon properly mounting of the seat 10 on the vehicle floor 14, the lower plate 30 of the seat sliding mechanism 12A is placed on the wing portion 38b of the main bracket 38 and a connecting bolt 42 (See FIG. 2) extending through the lower plate 30 is engaged with the opening 38c. For this connection, as is seen from FIG. 3, the stationary rail 16 and the lower plate 30 are formed with mated openings (no numerals) through which the connecting bolt 42 passes.

Although not shown in the drawings, the left wing portion of the main bracket 38 supports an inboard group of parts of a sliding mechanism of another seat (forward passenger seat) in substantially the same manner as that mentioned hereinabove.

As is seen from FIG. 3, an extra or sub-bracket 44 is secured or welded to the raised center portion of the lower plate 30 and extends rearwardly downwardly with respect to the longitudinal axis of the stationary rail 16. The sub-bracket or fifth bracket 44 is formed with an opening 44a at its lower portion. As is understood from FIG. 1, upon mounting of the seat 10 onto the vehicle floor 14, the sub-bracket 44 is placed on one side wall 22a of the floor tunnel 22 at a position behind the main bracket 38 and connected to the same. For this connection, the side wall 22a is formed with a nut-mounted opening 22b to which a connecting bolt 46 from the sub-bracket 44 is engaged. For reinforcing the area where the opening 22b is located, a reinforcing plate 47 is attached to the back side of the side wall 22a, as shown.

Designated by numeral 48 in FIG. 1 is an anchor stay for use with a safety seat belt (not shown). The anchor stay 48 carries thereon a catch member 48a of a known buckle assembly. As is seen from FIGS. 2 and 3, the anchor stay 48 is pivotally connected to the rounded lug 26a of the side plate 26 of the seat sliding mechanism 12A. For this connection, a connecting bolt 50 passes through an opening 48b of the anchor stay 48 and engages with the nut-mounted opening 28 of the rounded lug 26a. Thus, the anchor stay 48 moves together with the seat 10.

Figure 5:
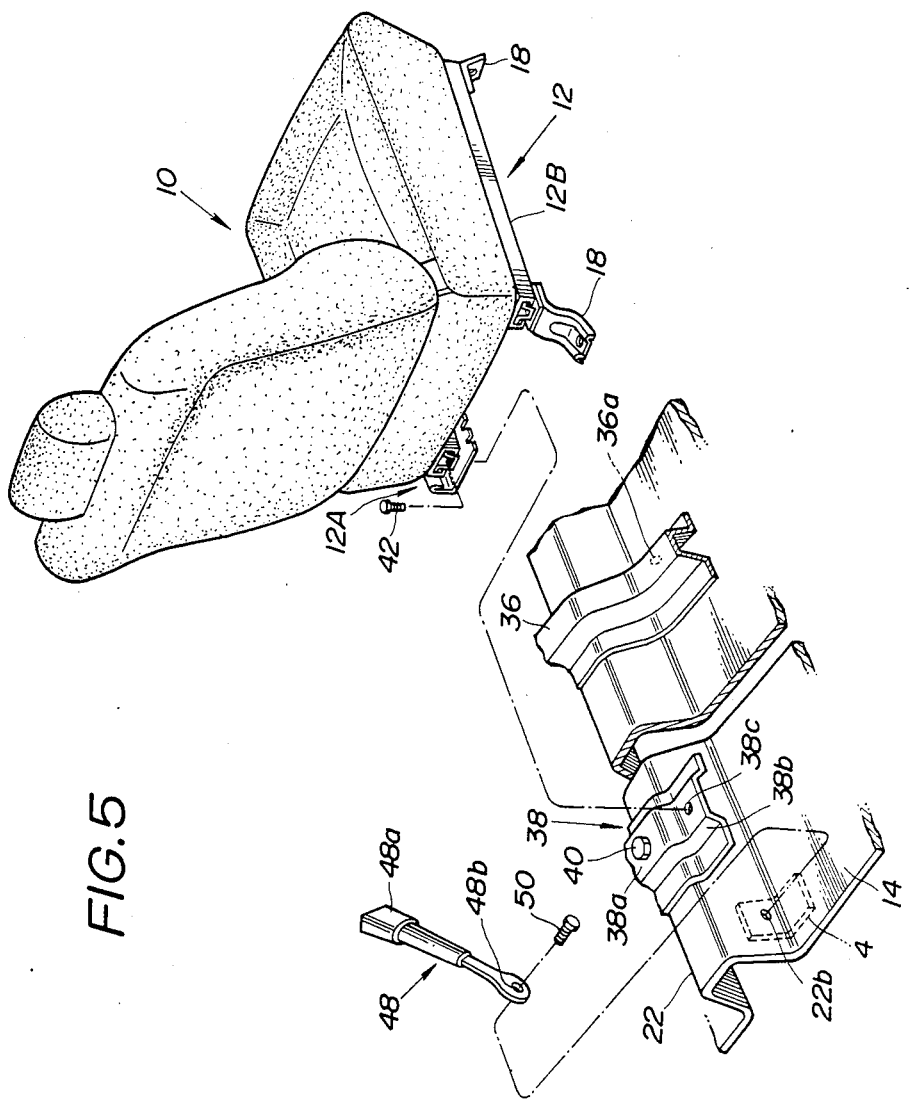
FIG. 5 is a view similar to FIG. 1, but showing a seat belt anchor stay which is to be mounted to a floor tunnel.

FIG. 5 shows a case wherein the anchor stay 48 is connected to the floor tunnel 22. In this case, the sub-bracket 44 and its associated parts, such as the side plate 26 and the raised portion of the lower plate 30 are unnecessary, as is understood from this drawing.

With the seat mounting arrangements of the present invention as described hereinabove, the following advantages are obtained, which are:

(1) Since the main bracket 38 having a tough or sturdy construction is used for supporting the portion of the seat to which an abnormally large force is applied upon a vehicle collision, the safety of the seat occupant is assured.

(2) Since the main bracket 38 is connected to the top of the floor tunnel 22 keeping a considerable space between each wing portion 38b of the bracket 38 and the vehicle floor 14, enlarged foot space for a passenger seated behind the seat 10 is obtained.

(3) Since the main bracket 38 is arranged to equally support two seats by its wing portions 38b, balanced supporting of the seats is achieved.

(4) Since the main bracket 38 is connected to the floor tunnel 22 with its wing portions 38b exposed to the interior of the vehicle, mounting and bolting the inboard assembly or group of parts 12A of the seat sliding mechanism 12 to the bracket 38 is accomplished with ease.

What is claimed is:

1. In a motor vehicle having a passenger seat on a vehicle floor with a floor tunnel at its inboard side, said seat being incorporated with a safety seat belt assembly, a seat mounting arrangement comprising:

a seat sliding mechanism including first and second assemblies, each assembly including a stationary rail connected to the vehicle floor and a slide rail secured to said seat and slidable on said stationary rail, so that said seat is slidable relative to said vehicle floor, said first assembly being located adjacent said vehicle floor tunnel;

first and second brackets secured to longitudinally spaced portions of the stationary rail of said first assembly and connected to said vehicle floor;

third and fourth brackets secured to longitudinally spaced portions of the stationary rail of said second assembly and connected to said vehicle floor, wherein at least one of said first and second brackets comprise a toughly constructed support member which transversely straddles said floor tunnel and is bolted to the same, said support member comprising a raised center portion bolted to said floor tunnel and two wing portions at opposite longitudinal ends of said support member extending in opposite directions from said center portion, one of said wing portions supporting thereon the associated stationary rail and secured to the same.

2. A seat mounting arrangement as claimed in claim 1, further comprising a fifth bracket which has a portion connected to said stationary rail of said first assembly and another portion connected to said floor tunnel.

3. A seat mounting arrangement as claimed in claim 2, in which said fifth bracket is located behind said one of said first and second brackets.

4. A seat mounting arrangement as claimed in claim 3, in which one end of said seat belt assembly is connected to the slide rail through an anchor stay.

5. A seat mounting arrangement as claimed in claim 4, in which said anchor stay is equipped with a catch member of a buckle assembly of said seat belt assembly.

6. A seat mounting arrangement as claimed in claim 5, in which an upper plate is interposed between said slide rail and the seat proper, said upper plate being equipped with a side plate to which said anchor stay is pivotally connected.

7. A seat mounting arrangement as claimed in claim 6, in which said upper plate is provided with a locking pawl pivotally connected thereto, and in which a lower plate is interposed between said slide rail and said at least one of said first and second brackets, said lower plate being formed with longitudinally aligned teeth to which said locking pawl is lockable upon positioning of said seat relative to the vehicle floor.

8. A seat mounting arrangement as claimed in claim 1, in which one end of said seat belt assembly is connected to said floor tunnel through an anchor stay.

9. A seat mounting arrangement as claimed in claim 8, in which said anchor stay is positioned behind said one of said first and second brackets.

10. A seat mounting arrangement as claimed in claim 1 wherein said first and second brackets lie transverse to said floor tunnel.

* * * * *